United States Patent

[11] 3,628,711

[72] Inventor William A. Martin
 Fairport, N.Y.
[21] Appl. No. 69,807
[22] Filed Sept. 4, 1970
[45] Patented Dec. 21, 1971
[73] Assignee Eastman Kodak Company
 Rochester, N.Y.

[54] INTERMITTENT FILM-FEEDING MECHANISM
 9 Claims, 2 Drawing Figs.
[52] U.S. Cl. ................................................... 226/49,
 226/62, 352/194
[51] Int. Cl. ..................................................... G03b 1/22
[50] Field of Search ......................................... 226/49, 62,
 65, 67; 352/194, 196

[56] References Cited
 UNITED STATES PATENTS
3,463,373 8/1969 Johnson et al. ............... 286/49
2,641,962 6/1953 Jungjohann .................. 226/62
2,521,957 9/1950 Wittel et al. .................. 226/65
 FOREIGN PATENTS
1,134,282 8/1962 Germany ...................... 352/194

Primary Examiner—Richard A. Schacher
Assistant Examiner—Gene A. Church
Attorneys—Robert W. Hampton and Raymond L. Owens ABSTRACT: An intermittent film-advancing mechanism especially suitable for use in film projection apparatus comprises a rigid claw member having a film-engaging projection disposed in and guided by a slot provided in a supporting wall. An eccentric cam arrangement drives a follower portion of the claw member to provide the requisite up-down projection movement. A ramp member is provided intermediate between the follower portion of the claw member and the film-engaging projection, and has two symmetric inclined surfaces, the first corresponding to a forward mode of projection and the second corresponding to a reverse mode of projection. Means are provided to selectively position either the first or second inclined surfaces in an engaging relation with the claw member so that in response to up-down movement the projection will reciprocate with the requisite in-out film-engaging movement. An important feature of the invention is the provision of means corresponding to a still mode of projection for engaging the claw member to prevent the projection from engaging the perforations of the film.

PATENTED DEC 21 1971 3,628,711

WILLIAM A. MARTIN
INVENTOR.

BY Raymond L. Owens
Robert W. Hampton

ATTORNEYS 3,628,711

INTERMITTENT FILM-FEEDING MECHANISM

BACKGROUND OF THE INVENTION

The present invention relates to intermittent film-advancing devices, such as used in motion-picture projector apparatus, for example.

Heretofore there has been considerable interest especially for use with motion-picture projectors, to provide a pulldown mechanism which can accomplish forward, reverse, and still modes of projection. Although prior arrangements have been devised which provide these functions, they are generally characterized by complex mechanisms. Such mechanisms may be plagued by difficulties such as causing damage to the film if slightly out of adjustment.

SUMMARY OF INVENTION

In accordance with a preferred embodiment of the present invention there is provided an elongated claw member which extends generally in the direction of film advance. The claw member is provided at one end with a film-engaging projection and with a cam follower portion at its other end which is driven by an eccentrically mounted cam arrangement to provide the required up-down movement of the projection. A ramp member is disposed intermediate between the cam follower portion and the film-engaging projection of the claw member and is selectively positionable so that either an incline surface corresponding to a forward projection mode engages the claw member or an incline surface corresponding to a reverse mode of projection engages the claw member. The inclined surfaces are adapted to slidably engage the claw member and in response to up-down movement move the projection with the requisite in-out movement. An important feature of the invention is the provision of means to prevent the claw projection from engaging the film when a still mode of projection is desired.

The invention, and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which.

DESCRIPTION OF THE PREFERRED EMBODIMENT

One use of apparatus in accordance with the invention is in cine projectors. Because projectors are well known, the present description will be directed in particular to elements forming part of, or cooperating more directly with, apparatus in accordance with the present invention. It is to be understood that projector elements not specifically shown or described may take various forms well known to those skilled in the art.

Figure 1:
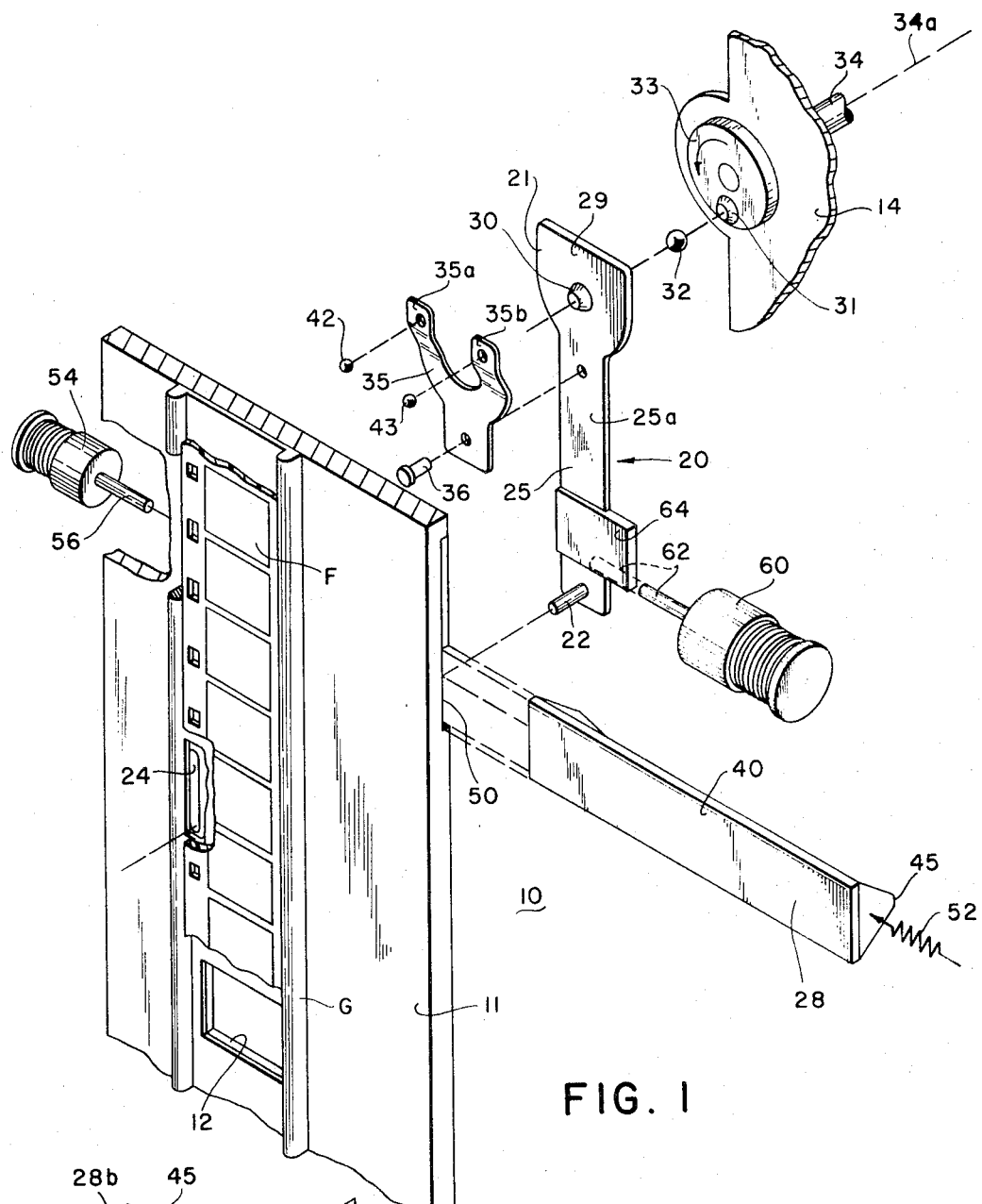
FIG. 1 is an exploded perspective view of an apparatus incorporating an exemplary film pulldown mechanism in accordance with a preferred embodiment of the present invention.

Referring now to FIG. 1, there is shown a photographic apparatus 10 comprising a gate having a wall 11 defining a film guide surface and provided with a projection aperture of opening 12 past which the film F is adapted to be intermittently moved in a rectilinear fashion. In the arrangement shown, this is a vertically downward direction. Film F is moved stepwise past the opening of 12 and is supported in a "film gate" G which is adapted to maintain the proper alignment of the film as each frame moves past the projection aperture. The film gate G may be of a conventional design having a pressure plate and side guides that is so well understood in the art that it need not be illustrated here. The opening 12 is in alignment with any suitable shutter mechanism 14 and an appropriate illuminating system, not shown. The wall 11 and the gate G constitutes a mounting means for permitting the film F to be moved in a rectilinear fashion.

The film F is adapted to be fed stepwise through the gate by a film-feeding mechanism 20, which includes a rigid elongated claw member 21, disposed so as to be aligned generally along the path of travel of the film F. At its free end, the claw 21 has a projection 22 in the form of a pin which is adapted to be received by a slot 24 formed in the wall 11. Actually, the projection 22 is adapted to engage and disengage corresponding perforations in the film F for advancing the film F. The slot 24 is rectangular in shape and its narrow sides are just slightly wider than the thickness of the projection 22 so that the projection 22 will not bind in the slot 24 when the mechanism 20 is in operation. The slot 24 has been positioned so that it extends in the direction of the film path substantially in alignment with the row of perforations on the film F and is long enough so as to permit the pulldown mechanism 20 to advance the next film frame into place.

The claw member 21 extends from its free end formed with the projection 22 along an intermediate portion 25 which has a flat surface 25a adapted to cooperate with a ramp member 28 described more fully hereinafter. The intermediate portion 25 of the claw member 21 merges into a follower portion 20 which is formed with a ball-receiving well 30. A ball 32 is so received or nested in a second well 31 of a disk member 33, and acts as an eccentric cam inasmuch as the ball 32 is received by both wells and provides the means of coupling a drive shaft 34 which drives the shutter mechanism 14 and the disk 33 to the claw member 21. The eccentric arrangement provides the means for providing the requisite up-down movement so well understood in the art. Advantageously, to reduce noise, the well 30 may be filled with some lubricant such as grease and surrounded by an appropriate sealing structure to prevent its leakage.

The axis 34a of the drive shaft 34 for the cam arrangement is disposed to be perpendicular to the path of advance of the film and if extended would intersect the centerline of the film strip F. Because of this location and the position of the projection 22, the claw member 21 extends in the viz substantially parallel to the film centerline) direction of film advance.

A bifurcated spring member 35 is secured at one end by a rivet 36 to the intermediate portion 25 and is so disposed that two free end blades 35a and 35b resiliently urge two mounted ball bearings 42 and 43 (one in each blade) into a constant sliding engaging relationship with the wall 11. A spring force is thus developed and is selected to be of such a level so as to keep the ball 32 in engagement with the disk 33 and the claw member 21. Moreover, the spring force urges the surface 25a into inclined surfaces of the ramp member 28, as will be described. However, it should be noted that by this arrangement, if the projection 22 in its move towards the film F finds that a perforation has been misaligned, the projection 22 will engage the film and the claw member 21 will lift off the cooperating ramp surface until the projection 22 enters a film perforation. Thereafter, a pulldown sequence will proceed.

Figure 2:
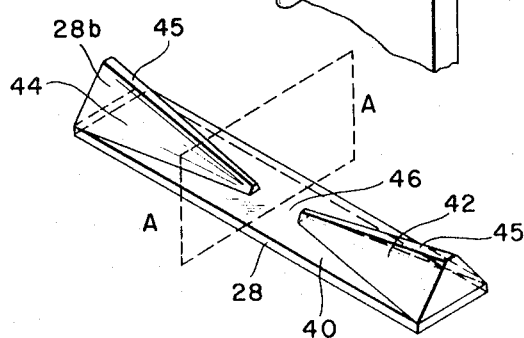
FIG. 2 is a perspective view of the ramp member of FIG. 1.

Turning now to FIG. 2, the ramp member 28 is shown comprised of a base portion 40 and two spaced ramp forming elements 42 and 44 integrally formed with the base 40. Element 42 corresponds to a forward mode of projection and element 44 to a reverse mode of projection. Each element has a somewhat triangular cross section apex portion being provided by a straight line. The locus of points of the apex portions of all the sectional areas forms a sloping-plane surface ramp 45 which actually engages the intermediate portion 25.

The elements 42 and 44 are symmetric about a medium plane A—A disposed equidistant between the elements. The area 46 of the base 40, between the elements 42 and 44, is selected to be wider than the width of the intermediate portion 25 of the claw member 21 so that in the pulldown portion of either forward or reverse mode of projection, the member 21 will be guided by the base 40 during the actual pulldown of the next film frame.

The member 28 is actually received by a channel 50 formed in the wall 11 and is urged by a spring 52 to a position against a stop (not shown) whereby the element 42 (forward mode) will engage the intermediate surface 25a during the pulldown cycle as will be explained shortly. To effect a reverse mode of projection, a solenoid 54 (see FIG. 1) is energized, and by means of a pin 56 coupled to the member 28 moves the member 28 against the urging of the spring 52 to a position wherein only the element 44 will engage the claw member 21.

Operation in the forward mode will now be described. Just prior to when the pulldown stroke is initiated, the claw 21 will be disposed in a position so that the surface 25a of the intermediate portion 25 will be driven as far up on the cam incline surface 45 of the element 42 as it can. Thereafter as operation commences, the intermediate surface 25a will be moved from off of this high-point position to the surface 46 of the base 40. The disk 33 will now drive the projection 22 downward and the pulldown of the film will commence. When the new film frame has been positioned, the eccentric cam arrangement will drive the intermediate portion 25 properly up the ramp surface 45 disengaging the projection 22 from the perforation. The protrusion 22 is now driven to its upmost position. It will thus be appreciated that "in-out" projection movement is caused by the ramp surface 46 in response to the up-down movement of the claw member 21. The operation in the reverse mode is the exact reverse of the forward mode and need not be described here.

The means for effecting a still mode of projection will now be described. A solenoid 60 is disposed adjacent the intermediate portion 25 of the claw member 21. In its normally deenergized condition the solenoid presents a pin 62 so as to engage a lateral projection portion 64 of the intermediate portion 25 and thereby prevents the projection 22 from being moved into engagement with a perforation on the film F. Accordingly, the pin 64 in this position sets a bottom limit on the inward travel of the projection 22 and thereby corresponds to a still mode of projection. When energized, the solenoid 60 withdraws the pin 62 from the inward-moving intermediate portion 64 and permits the projection 22 to undertake a pulldown stroke. After the solenoid is energized, it should be deenergized, only after the intermediate portion 25a has advanced a goodly distance up one of the ramp surfaces, to thereby prevent any possible interference.

The invention has been described in detail with particular reference to preferred embodiment thereof, but it will be understood that variations and modifications can be effected within the spirit and scope of the invention.

I claim:

1. In apparatus for intermittently advancing a filmstrip having a row of perforations along a predetermined path, the combination comprising:
   a. a wall defining a surface for guiding the filmstrip along the predetermined path and provided with a rectilinear slot opening onto said surface and extending in the direction of the predetermined path substantially in alignment with the row of perforations in the filmstrip.
   b. a movable, elongated member positioned adjacent said wall and including:
      1. a film-engaging projection extending into said slot and being guided for movement within the sides of said slot in response to movement of said elongated member,
      2. a follower portion, and
      3. an intermediate portion disposed between said projection and said follower portion;
   c. cam means coupled to said follower portion for moving said elongated member so that said projection executes rectilinear up-down movement;
   d. ramp means having a first inclined surface adapted to slidably engage said intermediate portion to move said projection in response to movement of said elongated member into and out of film engagement with a movement corresponding to a forward mode of projection and a second inclined surface adapted to slidably engage said intermediate portion to move said projection in response to movement of said elongated member into and out of film engagement with a movement corresponding to a reverse mode of projection; and
   e. means coupled to said ramp means for selectively positioning said first or second inclined surface in an engaging relation with said intermediate portion.

2. The invention as set forth in claim 1 including means adapted to engage with said elongated member for preventing said projection from engaging said film and thereby correspond to a still mode of projection.

3. The invention as set forth in claim 2 wherein said still mode means comprises a member movable from a position out of the path of said intermediate portion to a position for engaging said intermediate portion thereby preventing said film projection from engaging a perforation in the film.

4. The invention as set forth in claim 2 wherein said ramp means includes a member provided with said first and second surfaces.

5. The invention as set forth in claim 4 wherein said first and second surfaces which are symmetric about a median plane disposed equidistant between said first and second surfaces.

6. The invention as set forth in claim 2 wherein said cam means comprises an eccentrically mounted cam member coupled to said follower portion.

7. In an intermittent film advancing apparatus having different modes of operation wherein a filmstrip having a row of perforations is adapted to be fed in a rectilinear direction, means for advancing said film comprising:
   a. an elongated member having a film-engaging projection;
   b. means coupled to said elongated member for moving said projection in an up-down manner;
   c. a first inclined surface corresponding to a forward mode of projection;
   d. a second inclined surface corresponding to a reverse mode of projection; and
   e. means for selectively positioning either said first or said second surface to slidably engage said elongated member, wherein said projection executes in-out film engaging movement in response to up-down movement of said elongated member.

8. The invention as set forth in claim 7 wherein said surfaces are symmetrically about a median plane disposed equidistant between said surfaces.

9. The invention as set forth in claim 8 including means adapted to move into engagement with said elongated member for preventing said projection from engaging said film and thereby corresponding to a still mode of projection.

* * * * *